(12) United States Patent
Hasegawa et al.

(10) Patent No.: US 7,843,606 B2
(45) Date of Patent: Nov. 30, 2010

(54) COLOR CONVERTER, COLOR CONVERTING METHOD, AND COMPUTER READABLE MEDIUM

(75) Inventors: Noriko Hasegawa, Ebina (JP); Yasuki Yamauchi, Ashigarakami-gun (JP); Kiyoshi Une, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 625 days.

(21) Appl. No.: 11/651,555

(22) Filed: Jan. 10, 2007

(65) Prior Publication Data

US 2007/0279659 A1 Dec. 6, 2007

(30) Foreign Application Priority Data

Jun. 5, 2006 (JP) ............... 2006-156110

(51) Int. Cl.
*H04N 1/40* (2006.01)
*G03F 3/08* (2006.01)

(52) U.S. Cl. .............. 358/2.1; 358/3.23; 358/518; 358/519; 358/520; 358/521; 358/523

(58) Field of Classification Search ............... 358/2.1, 358/3.23, 515, 518, 519, 520, 521, 523, 15
See application file for complete search history.

(56) References Cited

U.S. PATENT DOCUMENTS

| | | | | |
|---|---|---|---|---|
| 5,432,906 A | * | 7/1995 | Newman et al. | 345/501 |
| 5,604,610 A | * | 2/1997 | Spaulding et al. | 358/525 |
| 5,987,165 A | * | 11/1999 | Matsuzaki et al. | 382/162 |
| 6,897,988 B1 | | 5/2005 | Saito et al. | |
| 7,030,888 B1 | * | 4/2006 | Edge et al. | 345/604 |
| 7,082,227 B1 | * | 7/2006 | Baum et al. | 382/311 |
| 2002/0029715 A1 | * | 3/2002 | Ogatsu et al. | 101/494 |
| 2002/0145744 A1 | * | 10/2002 | Kumada et al. | 358/1.9 |
| 2003/0133607 A1 | | 7/2003 | Goto et al. | |
| 2003/0193688 A1 | * | 10/2003 | Namikata | 358/1.15 |
| 2003/0202194 A1 | * | 10/2003 | Torigoe et al. | 358/1.9 |
| 2004/0179214 A1 | * | 9/2004 | Yabe | 358/1.9 |
| 2005/0270587 A1 | * | 12/2005 | Yamakawa et al. | 358/448 |
| 2006/0013478 A1 | | 1/2006 | Ito et al. | |

(Continued)

FOREIGN PATENT DOCUMENTS

JP   A-2001-045310   2/2001

(Continued)

OTHER PUBLICATIONS

Jun. 29, 2010 Office Action issued in Japanese Patent Application No. 2006-156110 (with translation).

*Primary Examiner*—King Y Poon
*Assistant Examiner*—Vincent R Peren
(74) *Attorney, Agent, or Firm*—Oliff & Berridge, PLC

(57) ABSTRACT

A color converter has a setting section, a determining section, and a converting section. The setting section sets the ratio between plural color rendering intents. The determining section determines a color conversion function for converting a first image signal in a first color space into a second image signal in a second color space different from the first color space, based on the ratio between the color rendering intents. The converting section converts the first image signal into the second image signal based on the color conversion function determined by the determining section.

16 Claims, 13 Drawing Sheets

U.S. PATENT DOCUMENTS

2006/0050288 A1 * 3/2006 Aschenbrenner et al. ..... 358/1.9

FOREIGN PATENT DOCUMENTS

| JP | A-2003-209707 | 7/2003 |
| JP | A-2003-209708 | 7/2003 |
| JP | A 2003-324620 | 11/2003 |
| JP | A-2004-120253 | 4/2004 |
| JP | A 2004-153337 | 5/2004 |
| JP | A-2005-157654 | 6/2005 |
| JP | A 2005-184601 | 7/2005 |
| JP | A 2005-184602 | 7/2005 |
| JP | A 2005-191808 | 7/2005 |
| WO | WO 2004/032524 A1 | 4/2004 |

* cited by examiner

F I G. 1
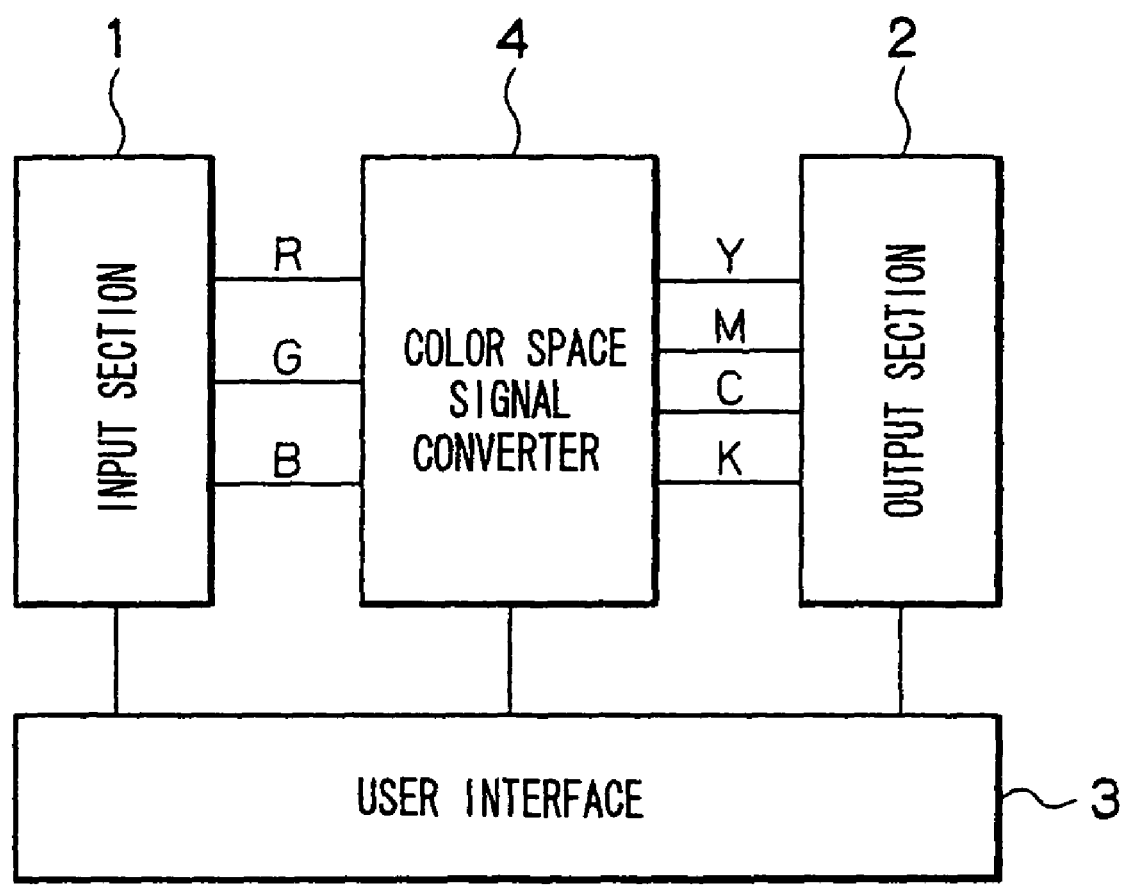

F I G. 5
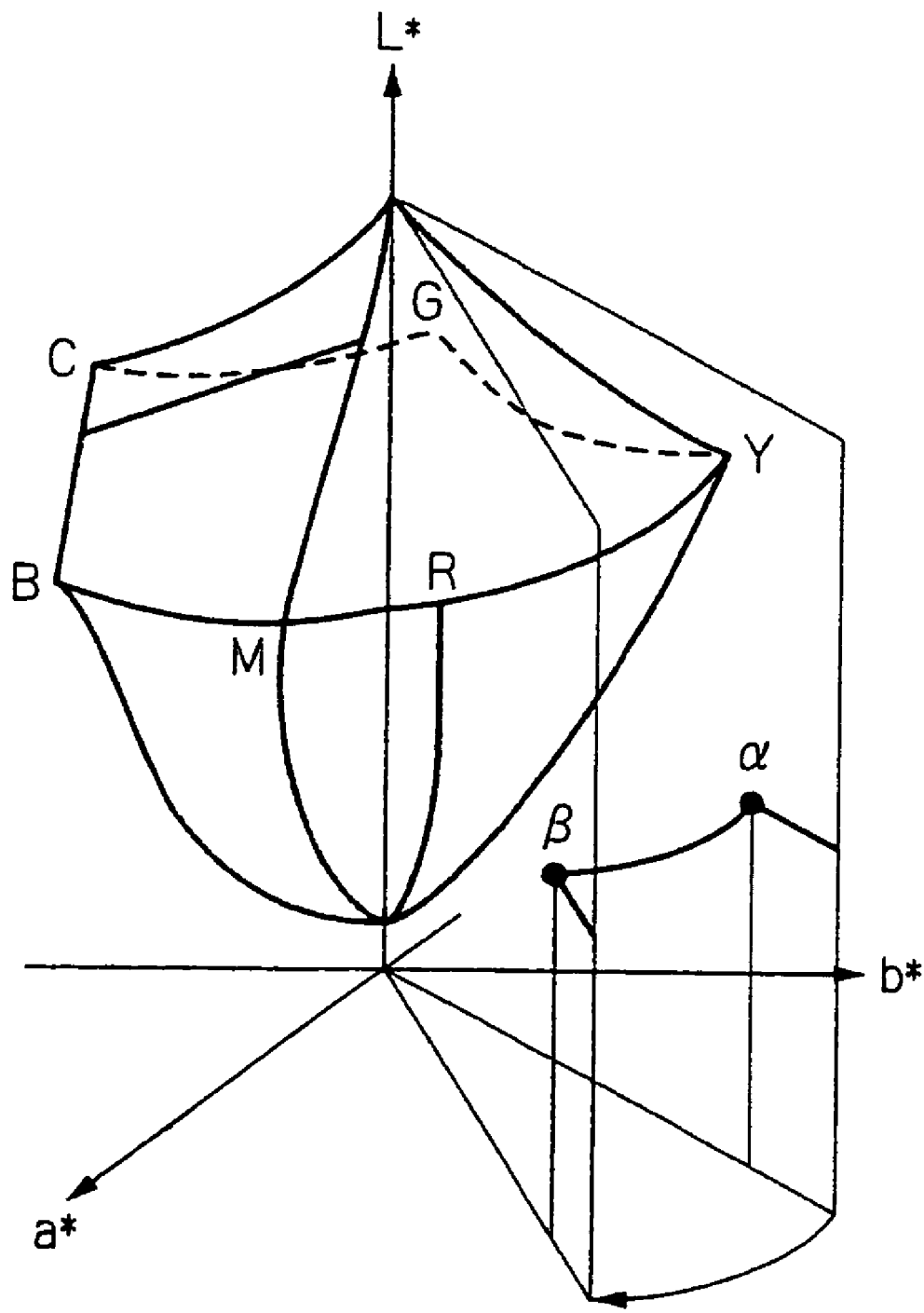

F I G. 10
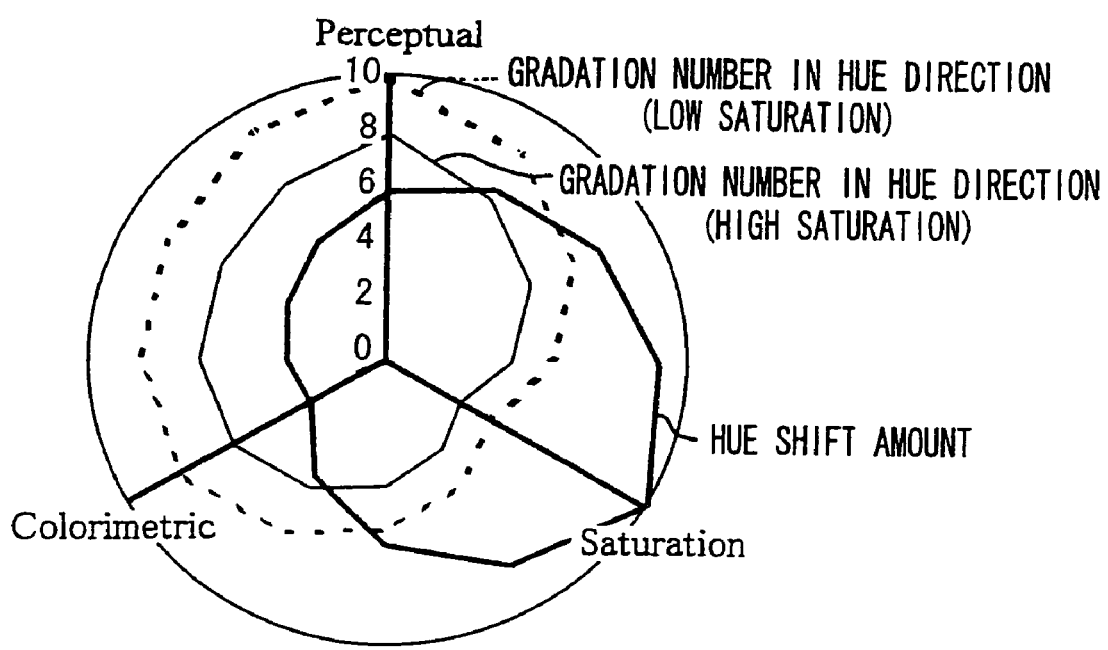

F I G. 11
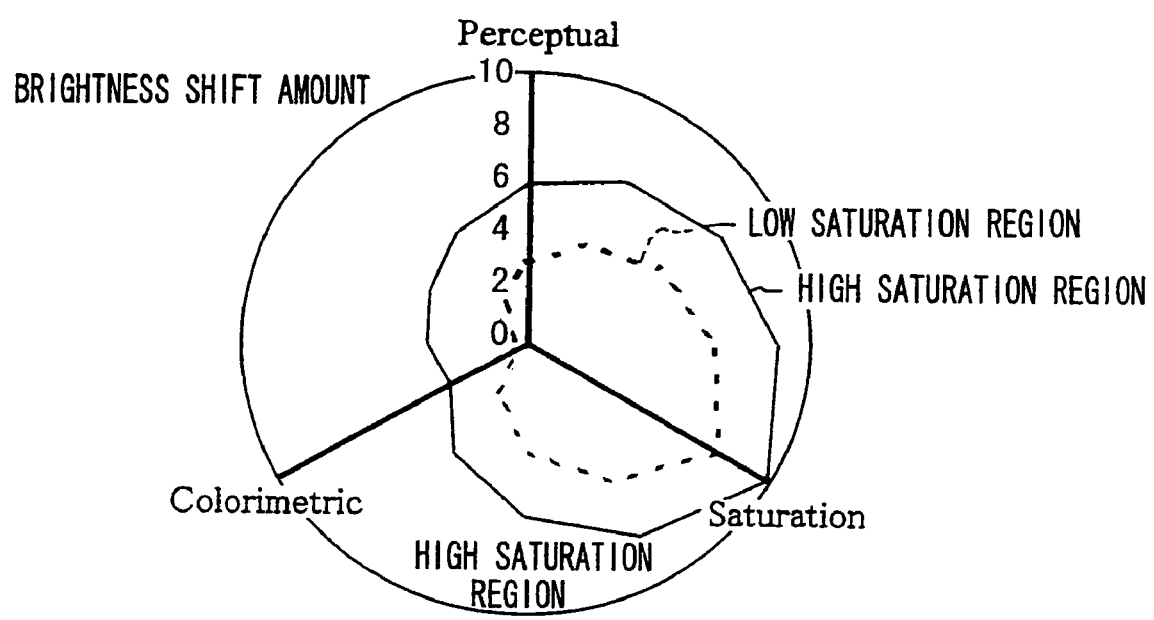

F I G. 1 2
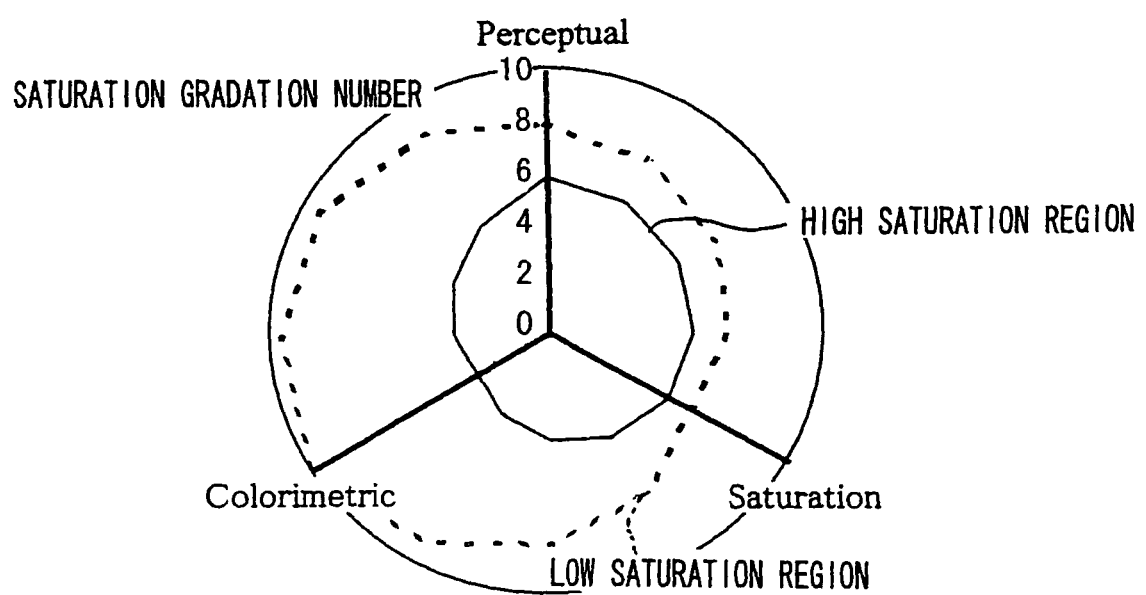

$f(x) = (L'in / Lin)^{\wedge}(Cnl)$  Cnl: COMPRESSION COEFFICIENT
$L'out = L'in \times (Lout / Lin)^{\wedge} f(x)$

COLOR CONVERTER, COLOR CONVERTING METHOD, AND COMPUTER READABLE MEDIUM

CROSS-REFERENCE TO RELATED APPLICATIONS

This application is based on and claims priority under 35 USC 119 from Japanese Patent Application No. 2006-156110 filed Jun. 5, 2006.

BACKGROUND

1. Technical Field

The invention relates to a color converter, a color converting method, and a color conversion program, and more particularly, it relates to a color converter and a color converting method and a computer readable medium for storing a program for making a computer execute a process for color conversion for converting the color of a color image signal when the color reproducible region of the color image signal is different between an input side and an output side.

2. Related Art

As a device for outputting a color image, there are display devices such as a CRT and a color LCD and printing devices such as a printer. Among these output devices, the reproducible color range is different because of a difference in an output method. A CRT may reproduce a vivid color in a region with high brightness because its output method is a fluorescent material lighting type. On the other hand, It is difficult to for a printer to reproduce a color with high brightness and high saturation other than the primary color because it generates a color while overlaying the color materials, and on the whole, it may reproduce a color in a region with low brightness.

In this way, color reproducible region is various depending on the output device. Therefore, when the same image data is supplied by the different output device, for example, when an image created on a CRT is printed by a printer, there may exist a color which is not able to be reproduced. For example, a color with high brightness and high saturation may be outputted on a CRT, but sometimes it may not be reproduced by a printer. On the contrary, a color with low brightness and low saturation may be reproduced by a printer, but sometimes it may not be displayed on a CRT. Therefore, at least the non-reproducible color is converted into a color that looks closest to it and outputted to the output device, thereby reproducing the whole image in the best quality in the output device. At this time, color mapping for substituting a color within the color reproducible region of the output device for a given color image signal is required.

As a conventional color mapping technique, there is a technique in which color conversion coefficients corresponding to various purposes are prepared and a color is converted with a color conversion coefficient corresponding to a desired purpose. For example, there is a color conversion using an ICC profile. In the ICC profile, three intents (Perceptual, Saturation, Relative Colorimetric) are prepared. These three modes are widely different in the purpose of use; for photo, for graphics, and for calorimetric matching and they don't necessarily agree with a user's purpose.

SUMMARY

In consideration of the above circumstances, the present invention provides a color converter, a color converting method, and a computer readable medium.

According to an aspect of the invention, there is provided a color converter including: a setting section that sets a ratio between plural color rendering intents; a determining section that determines a color conversion function for converting a first image signal in a first color space into a second image signal in a second color space different from the first color space, based on the ratio between the color rendering intents; and a converting section that converts the first image signal into the second image signal based on the color conversion function determined by the determining section.

BRIEF DESCRIPTION OF THE DRAWINGS

Exemplary embodiments of the present invention will be described in detail based on the following figures, wherein:

FIG. 1 is a block diagram showing a schematic constitutional example of a color converter according to the invention.

FIG. 5 is a concept view of hue changing processing in a hue converter.

FIG. 10 is a view showing an example of distribution of an element of gamut compression/decompression on a hue shift amount.

FIG. 11 is a view showing an example of distribution of an element of gamut compression/decompression on a brightness shift amount.

FIG. 12 is a view showing an example of distribution of an element of gamut compression/decompression on a saturation shift amount.

DETAILED DESCRIPTION

Figure 2:
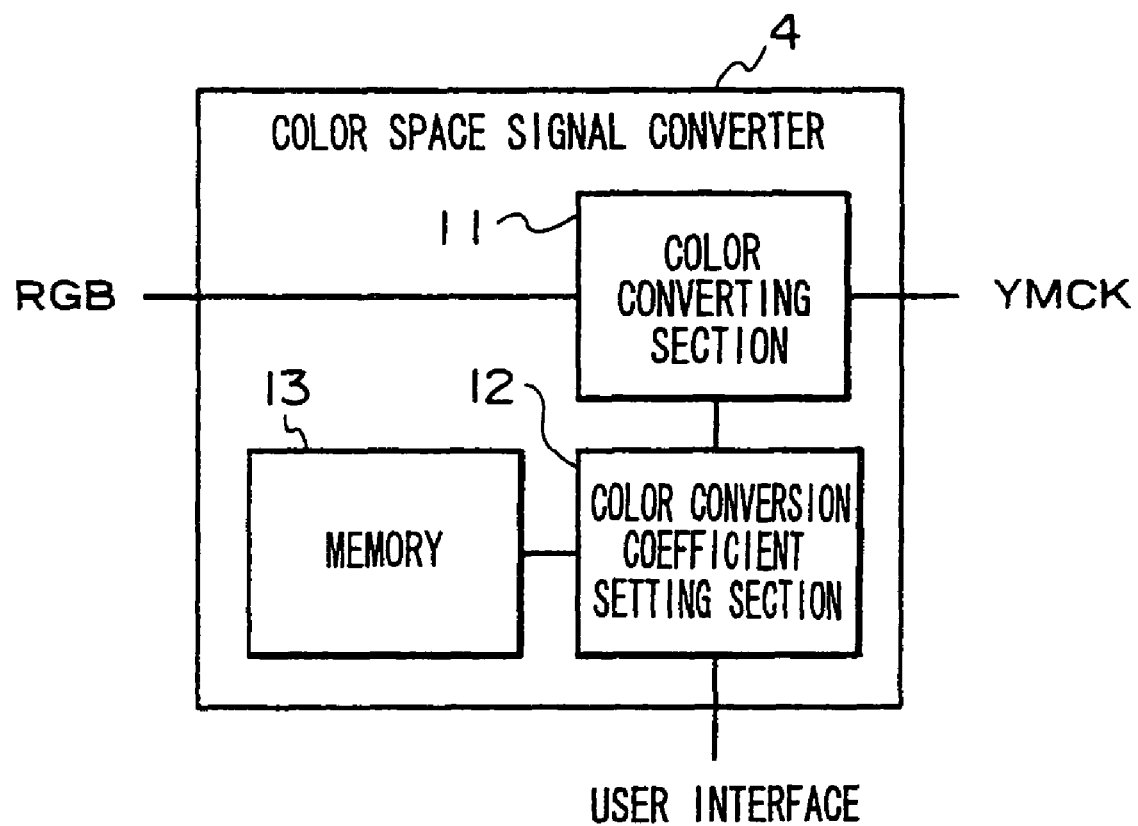
FIG. 2 is a block diagram showing a schematic constitutional example of a color space signal converter in the color converter.

An exemplary embodiment of the invention will be hereinafter described in detail referring to the drawings.

At first, a schematic structure of an image processor will be described. FIG. 1 is a block diagram showing a schematic constitutional example of the color converter according to the invention. The color converter described here is to be used, mounted on an image output device such as a digital copy machine and a printer, on a server connected to the image output device, or on a computer (driver) giving an operational instruction to the image output device. As shown in FIG. 1, it includes an input section 1, an output section 2, a user interface 3 (hereinafter, abbreviated as "UI"), and a color space signal converter 4.

The input section 1 is to obtain an input image signal. The input image signal includes, for example, a color image signal in an RGB color space to be displayed on a CRT and the like, a color image signal in a CIELab color space, and a color image signal in a CMYK color space. In the exemplary embodiment, a description will be made in the case where an input image signal is the color image signal in the RGB color space.

The output section 2 is to output an output image signal. The output image signal includes, for example, a color image signal in a YMC color space and a color image signal in a YMCK color space to be printed by a printer. In the exemplary embodiment, a description will be made in the case where an output image signal is the color image signal in the YMCK color space.

The UI 3 is to perform various setting on the color space signal converter 4 according to a user's operation.

The color space signal converter 4 is to convert an input image signal obtained by the input section 1 into an output image signal to be outputted by the output section 2. The color space signal converter 4 does the above conversion after the gamut compression/decompression processing of the input image signal.

Here, the color space signal converter 4 will be more specifically described. FIG. 2 is a block diagram showing a schematic constitutional example of the color space signal converter. As shown in FIG. 2, the color space signal converter 4 includes a color converting section 11, a color conversion coefficient setting section 12, and a memory 13.

The color converting section 11 converts the input image signal in the RGB color space into a signal (a first image signal) in a color space independent of a device, for example, the CIE-L*a*b* color space (a first color space), and after that, it converts the signal into an output image signal (a second image signal) in the YMCK color space according to a color conversion look-up table (LUT) created by the color conversion coefficient setting section 12 or a color conversion LUT stored in the memory 13.

These sections 11 to 13 are included in, for example, an image output device, a server, or a driver, and each of them may be realized by a predetermined program executed by a computer that is formed by a combination of a CPU (Central Processing Unit), a ROM (Read Only Memory), a RAM (Random Access Memory), and the like.

In the conversion processing of a color image signal, at first, each color gamut on the input side and on the output side is obtained in advance. At the time, it may be obtained in the color space independent of the device, for example, the CIE-L*a*b* color space. In the following description, the inner processing is performed in the CIE-L*a*b* color space.

Figure 3:
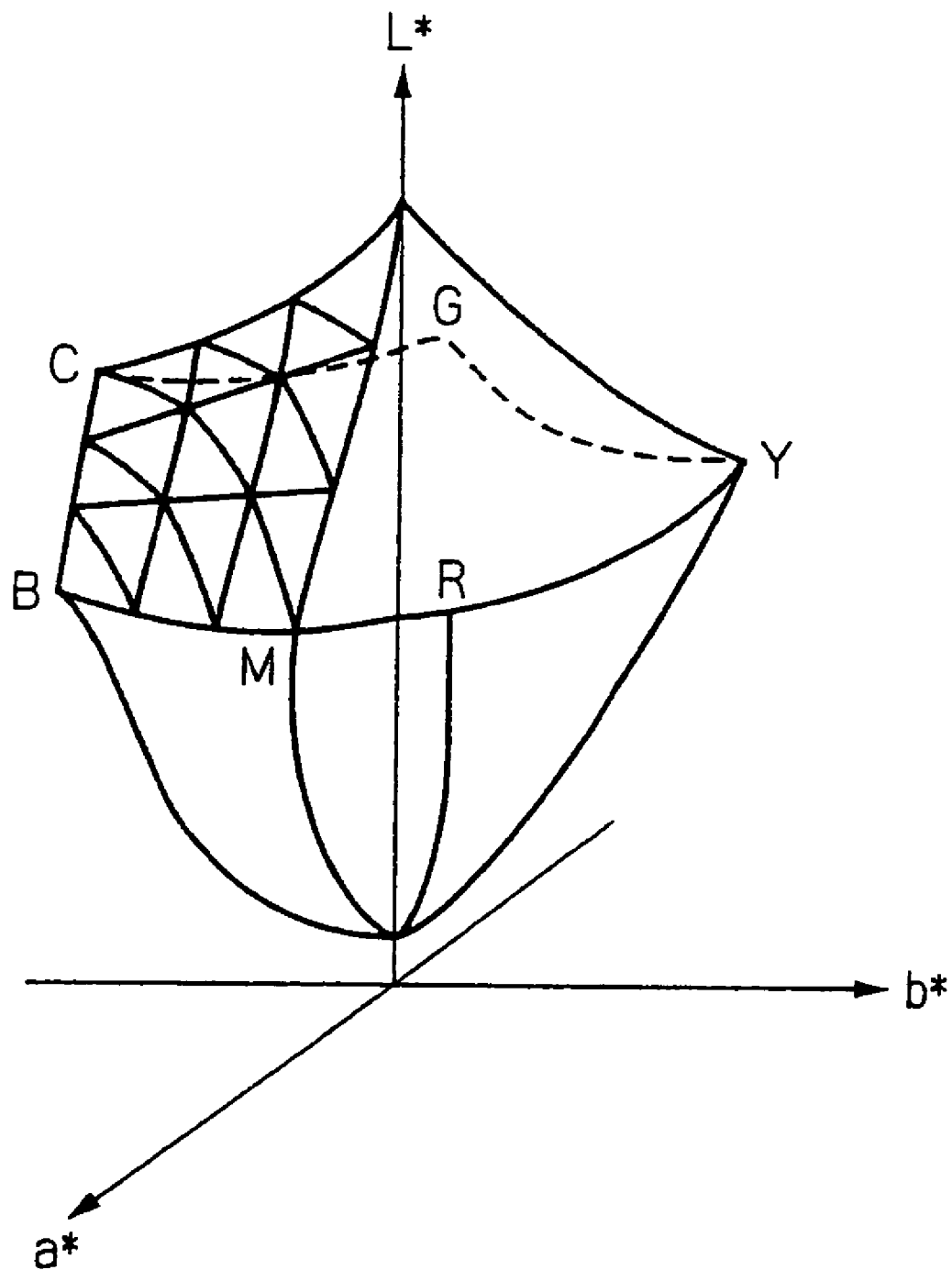
FIG. 3 is a concept view showing an example of a color gamut.

FIG. 3 is a concept view showing an example of a color gamut. Generally, the color gamut is not uniform, but it has a complicated three-dimensional shape as shown in FIG. 3. The inside of the three dimension, as illustrated, is the region in which a color may be reproduced, and the outside is a region in which a color may not be reproduced. Therefore, when a color gamut is required, information on the surface (outer surface) indicating a boundary between the region in which the color may be reproduced and the region in which the color may not be reproduced, is required. As the above, because the shape of the outer surface is not uniform, it may be expressed with the surface divided into polygon such as triangle. In FIG. 3, only one portion of the outer surface is illustrated with it segmented into the triangle shapes, but this segmentalization is performed on the whole outer surface.

Color gamut data indicating the obtained input color gamut and output color gamut is stored into the memory 13 within the color space signal converter 4. In the memory 13, the color conversion LUT corresponding to each intent of the ICC profile is stored for every color converting object. A color conversion function corresponding to each intent may be stored there for every color converting object.

Figure 4:
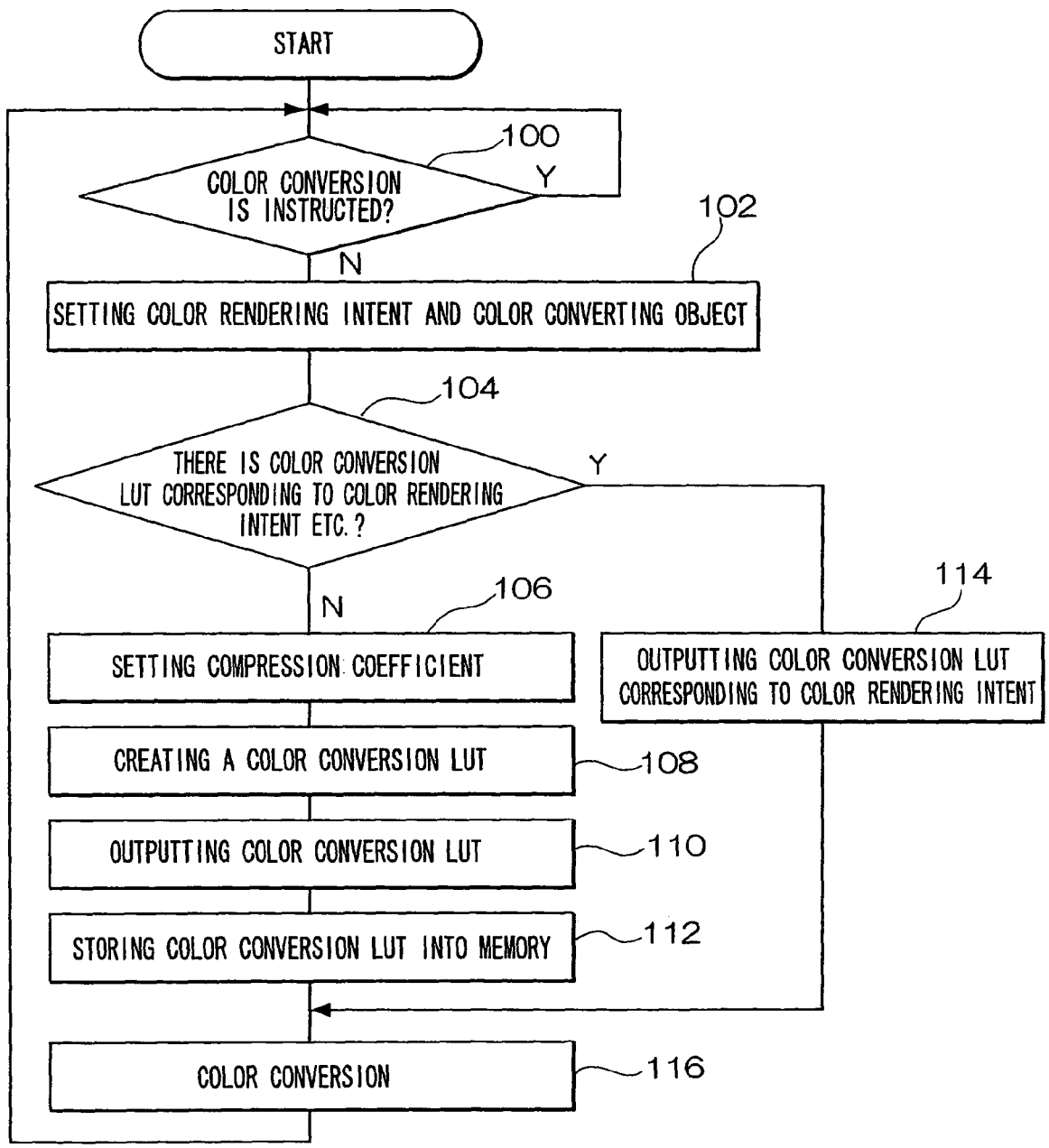
FIG. 4 is a flow chart of the processing executed by the color space signal converter.

Next, routine processing executed by the color space signal converter 4 will be described referring to a flow chart shown in FIG. 4.

At first, in Step 100, the color conversion coefficient setting section 12 determines whether or not a user has instructed the color conversion processing through the operation of the UI 3, and when the color conversion process is instructed, the processing moves to Step 102.

In Step 102, the color conversion coefficient setting section 12 makes the UI 3 display a setting screen, not illustrated, for setting a color rendering intent and a color converting object, hence to induce a user to set a color rendering intent and a color converting object. As the color rendering intent, there are the above-mentioned three intents (Perceptual, Saturation, Relative Colorimetric) defined in the ICC profile. They show the characteristics of color reproduction such as monitor emphasizing, saturation emphasizing, gradation reproducibility, contrast, and calorimetric matching, which are required in an output environment desired by a user. As the color converting object, there are such as natural image, graphic, text, and gradation, but it is not limited to them. In addition to the color rendering intent and color converting object, a specified color which is especially desired to be converted (for example, red) and the conversion target value (for example, colorimetric value) may be settable. In this case, when the specified color is a main color (for example, C, M, Y, R, Q and B), even if the main color has the color conversion target, priority is given to the conversion of the set conversion target value.

In the setting of the color rendering intent, for example, one of the three intents may be set singularly, or a ratio between at least two of the three intents and more may be set. The ratio between the intents may be set directly by a user, or a rate of each intent may be expressed on three axes crossing each other and any position may be specified in the three dimension space, hence to set the coordinates of the position as the ratio among the intents. By setting the ratio among the intents, color including a desired ratio of each intent characteristic may be reproduced and color in accordance with a user's intention may be reproduced.

Alternatively, the intents are not limited to the above three intents defined by the ICC profile, but they may be set in an expression easy to recognize the color rendering intent instinctively, such as monitor emphasizing, saturation emphasizing, gradation reproducibility, contrast, and calorimetric matching.

In Step 104, the color conversion coefficient setting section 12 determines whether or not the color conversion LUT corresponding to the set color rendering intent and set color converting object is stored in the memory 13. In the memory 13, at first, for example, the color conversion LUT corresponding to each color converting object is previously stored for every intent. The color conversion LUT is the data indicating the correspondence, with the three dimensional CIE-L*a*b* color space divided into plural rectangular solids, among the values of L*, a*, b* on a lattice point in each solid and the values of YMCK in the YMCK color space in the output device. Not only the color conversion LUT of Lab-YMCK but also the color conversion LUT of RGB-YMCK may be previously stored in the memory 13.

When the color conversion LUT corresponding to the color rendering intent and color converting object set in Step 102 is stored in the memory 13, the processing moves to Step 114, and when it is not stored, the processing moves to Step 106.

In Step 114, the color conversion coefficient setting section 12 reads out the color conversion LUT corresponding to the set color rendering intent and color converting object from the memory 13 and outputs it to the color converting section 11.

On the other hand, when the color conversion LUT corresponding to the set color rendering intent and color converting object is not stored in the memory 13, the compression coefficient of the gamut compression/decompression function (color conversion function) in the gamut compression/decompression processing of the input image signal is set in Step 106.

As characteristics of the gamut compression/decompression, for example, there are a hue conversion characteristic, a brightness conversion characteristic, a brightness and saturation compression characteristic, a gradation characteristic in a hue direction, and a gradation characteristic in a saturation direction. The hue conversion characteristic is to indicate the conversion characteristic in the hue direction, including a hue shift amount for every hue region and the like. FIG. 5 is a concept view showing an example of the hue changing processing. In the CIE-L*a*b* color space, hue is changed by rotational movement around the L* axis. For example, the color of a point α shown in FIG. 5 is rotated through the hue conversion processing, into the color of a point β.

The brightness conversion characteristic is to show the conversion characteristic in a brightness direction, where a brightness conversion amount is determined according to the saturation.

Figure 6:
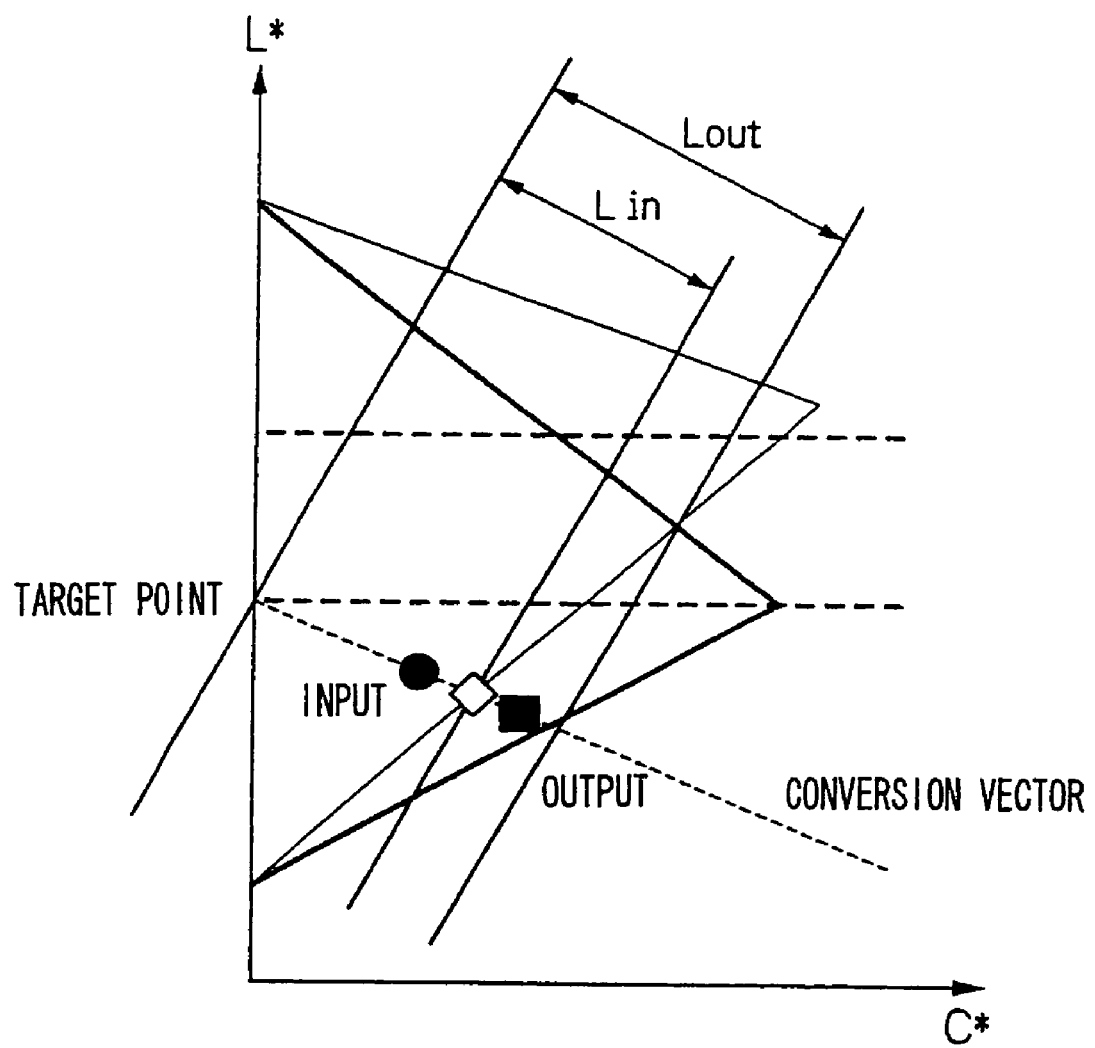
FIG. 6 is an explanatory view showing an example of gamut compression/decompression processing.

The brightness and saturation compression characteristic is to show a compression characteristic in a brightness and saturation direction at a time of compressing an input image signal into an output image signal. FIG. 6 is a concept view showing an example of the compression processing in the brightness and saturation direction. In this case, for example, an achromatic color that has the brightness of a point having the maximum saturation in the color gamut (shown by the heavy line in FIG. 6) is a target point, a line connecting the target point with the input image signal is set as a conversion vector, and the input image signal is compressed on the conversion vector, hence to obtain the output image signal (the detail will be described later).

Figure 7:
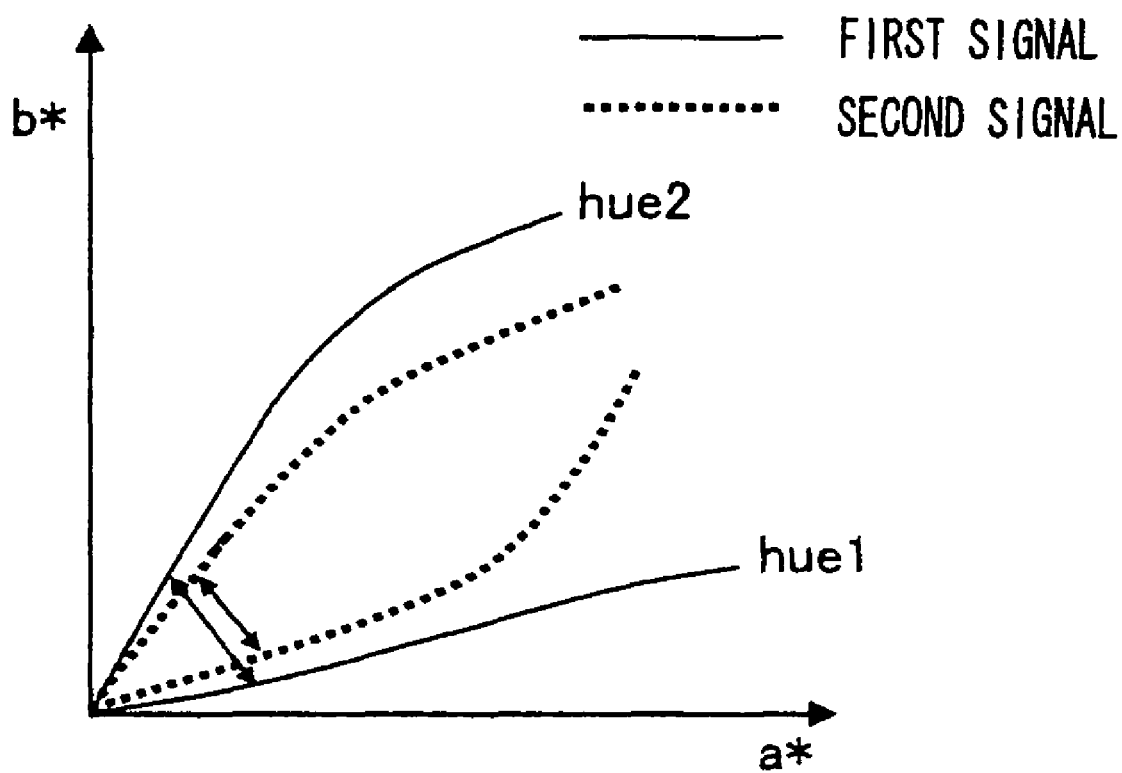
FIG. 7 is a concept view showing an example of gradation characteristic in a hue direction.

The gradation characteristic in the hue direction is to show crudeness of the conversion at a time of conversion into the hue direction. FIG. 7 is a concept view showing an example of the gradation characteristic in the hue direction. The first signal indicates a signal before the conversion and the second signal indicates a signal after the conversion. Although the hue of the high saturation region or of the maximum saturation point of each hue is converted through the above hue conversion processing, the gradation characteristic in the hue direction shows that one in the other region than the high saturation region or the maximum saturation point of the hue, between a predetermined hues (hue 1 and hue 2). In FIG. 7, from a low saturation to a middle saturation, the gradation in the hue direction of the first signal is kept, the high saturation region decreases in the gradation in the hue direction.

Figure 8:
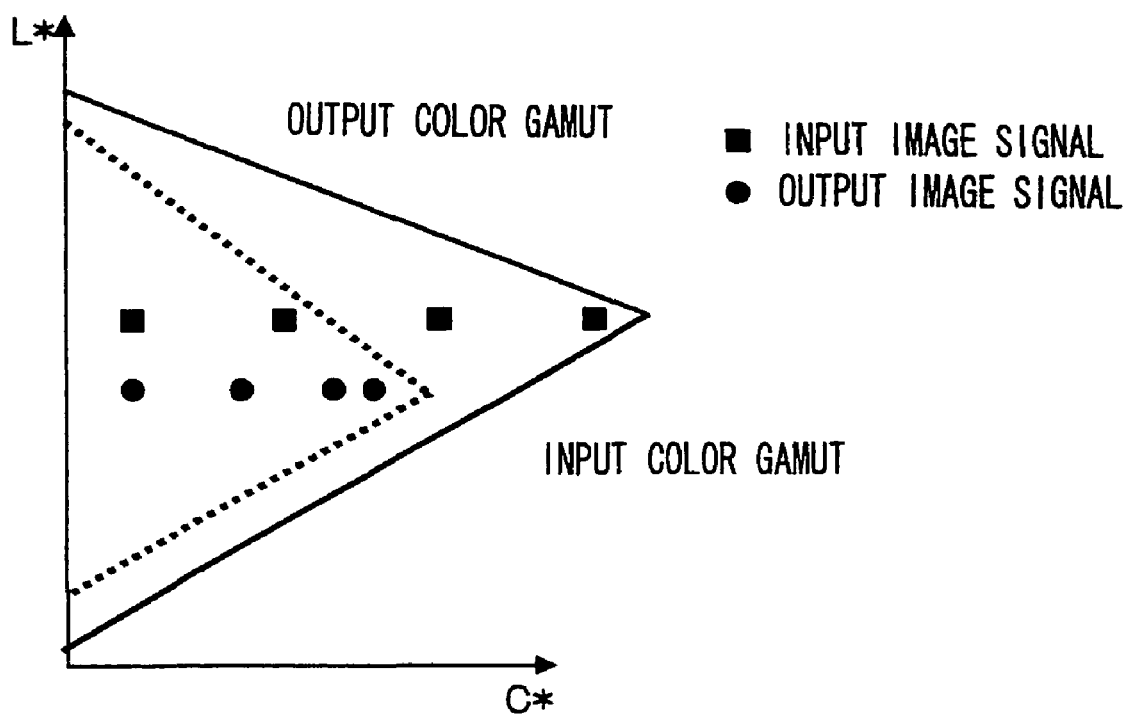
FIG. 8 is a concept view showing an example of gradation characteristic in a saturation direction.

FIG. 8 is a concept view showing an example of a gradation characteristic in a saturation direction. In FIG. 8, the gradation characteristic in the saturation direction of the input image signal has such a characteristic that in the output image signal obtained by converting the input image signal, the gradation decreases in the high saturation region and increases in the lower saturation region.

FIGS. 9 to 12 respectively show an example of relation between the distribution of gamut compression/decompression elements and the color rendering intents. As the element of gamut compression/decompression, for example, there are brightness and saturation compression ratio, hue shift amount, gradation number in the hue direction, brightness shift amount, saturation gradation number and the like.

Figure 9:
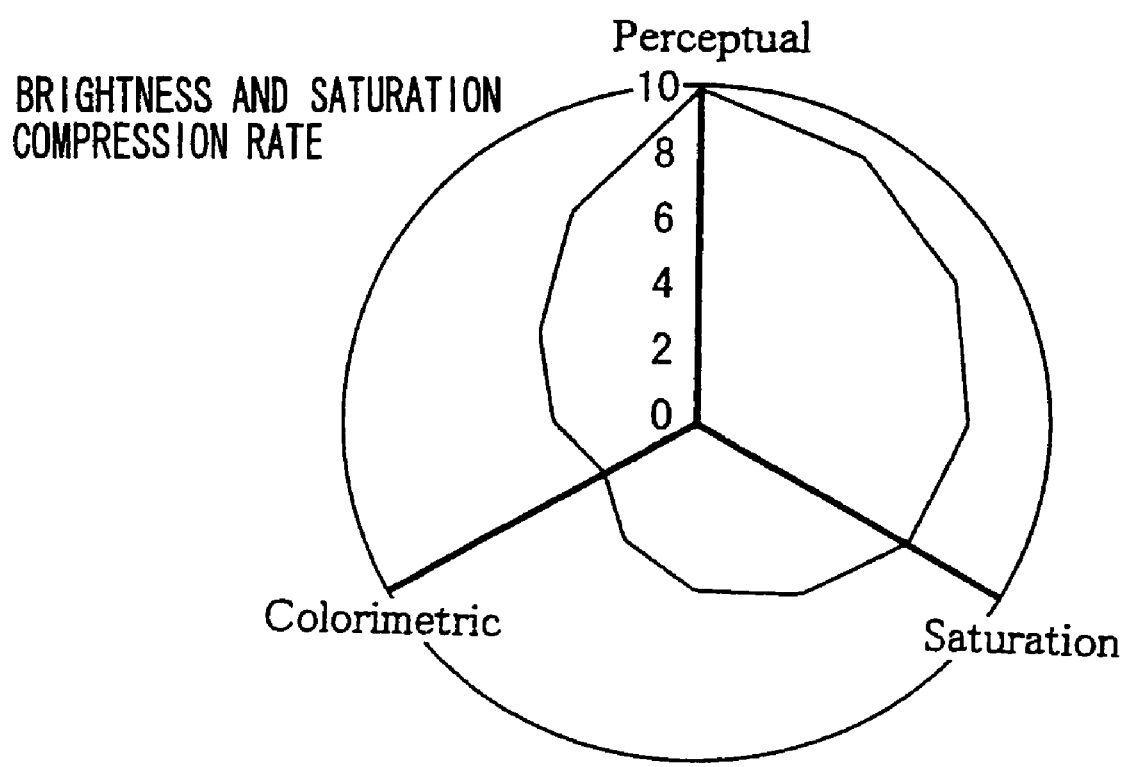
FIG. 9 is a view showing an example of distribution of an element of gamut compression/decompression on a brightness and saturation compression ratio.

FIG. 9 shows an example of the element distribution of the brightness and saturation compression ratio. As shown in FIG. 9, the distribution goes that the brightness and saturation compression ratio is the highest in Perceptual and decreases in the order of Saturation and Colorimetric.

FIG. 10 shows an example of the element distribution of the hue shift amount and the gradation number in the hue direction. As shown in FIG. 10, the distribution goes that the hue shift amount is decreasing in the order of Saturation, Perceptual, and Colorimetric and that the gradation number in the hue direction is decreasing in the order of Perceptual, Colorimetric, and Saturation. Further, the characteristic of the change is different between the high saturation region and the low saturation region.

FIG. 11 shows an example of the element distribution of the brightness shift amount. As shown in FIG. 11, the distribution goes that it is decreasing in the order of Saturation, Perceptual, and Colorimetric. Similarly, the characteristic of the change is different between the high saturation region and the low saturation region.

FIG. 12 shows an example of the element distribution of the saturation gradation number. As shown in FIG. 12, the distribution goes that the saturation gradation number of the low saturation region is high in Colorimetric and the saturation gradation number of the high saturation region is high in Perceptual.

The above-mentioned characteristic of the gamut compression/decompression varies depending on the compression coefficient included in each gamut compression/decompression function. Therefore, in Step 106, the color conversion coefficient setting section 12 sets the gamut compression/decompression function by setting the compression coefficient corresponding to the color rendering intent and color conversion object set in Step 102. The compression coefficient may be previously stored into the memory 13 as the compression coefficient table data, for example, for every intent, for every ratio among intents, for every color conversion object, or for every gamut compression/decompression element, hence to obtain and set the compression coefficient corresponding to the intent and color converting object selected by a user. It is not limited to this, but anything will do as far as it is possible to set the compression coefficient corresponding to the color rendering intent and color converting object set by a user.

Here, a compression method will be described. At first, as the compression method relating to the above-mentioned brightness and saturation compression ratio and the saturation gradation number, the method described in, for example, Japanese Patent Application Laid-Open No. 2005-191808 may be adapted. The compression coefficient Cn11 of this compression method is included in the non-linear function as a parameter, for converting the input image signal into the output image signal and it is the parameter for specifying the compression ratio on the above-mentioned conversion vector. Therefore, the compression coefficient Cn11 is specified according to a distance between the target point (achromatic color point) on the conversion vector and the point showing the input image signal.

Figure 13:
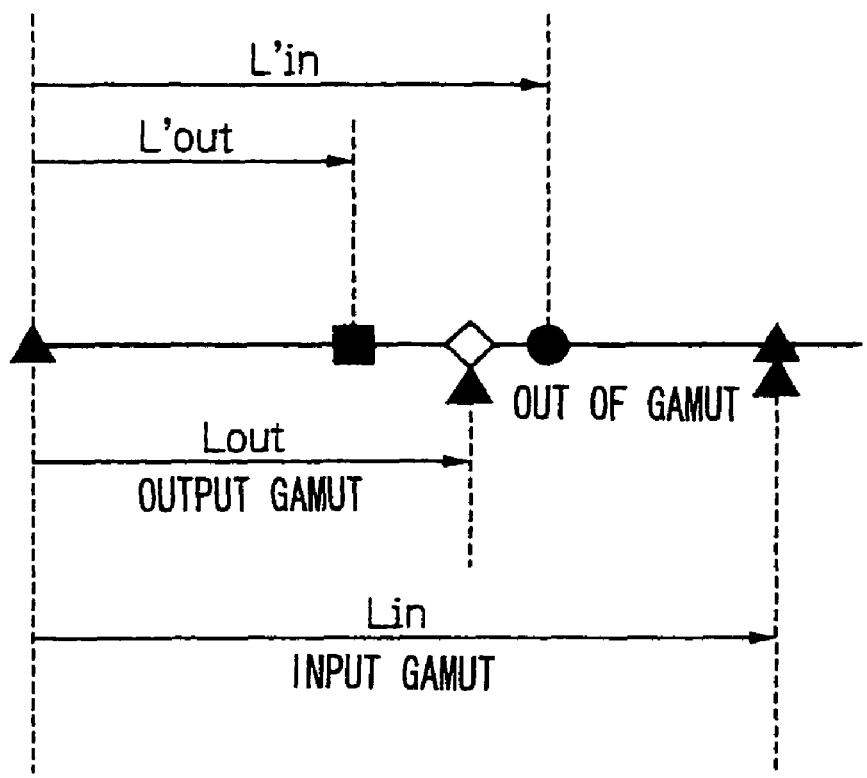
FIG. 13 is a describing view showing an example of non-linear gamut compression/decompression processing.

FIG. 13 is an explanatory drawing showing an example of the non-linear gamut compression/decompression processing. As shown in FIG. 13, the distance L'out from the achromatic color point on the conversion vector to the output image signal is obtained, using the non-linear function of the formula (1) and formula (2) shown as follows, based on the respective distances Lin and Lout from the achromatic color point on the conversion vector to the respective outer points of the input color gamut and the output color gamut, the distance L'in from the achromatic color point to the input image signal, and the compression coefficient Cn11 (shown as Cn1 in FIG. 13) set according to the color rendering intent and color converting object.

$$L'\text{out} = L'\text{in} \times (L\text{out}/L\text{in})^{f(x)} \quad (1)$$

$$f(x) = (L'\text{in}/L\text{in})^{Cn11} \quad (2)$$

By changing the compression coefficient Cn11, it is possible to change the brightness and saturation compression ratio and the saturation gradation number.

Next, as the compression method about the above hue shift amount, the method described in, for example, Japanese Patent Application Laid-Open No. 2005-184601 may be adapted. In the method, the hue is converted by a predetermined hue conversion function. In the hue conversion function, the hue is changed in a way of changing the degree of the hue conversion according to the saturation in the input image signal, the hue varies widely in the high saturation region, while it does not change much in the low saturation region. The hue conversion function includes the compression coefficient as a parameter, which is set in order to attach a weight to the hue conversion degree in the saturation direction. Specifically, an index function like the following formula is used.

$$C\text{out} = C\text{in} - C\text{dif} \times (C\text{data}/C\text{max})^{Cn12} \quad (3)$$

In the formula (3), Cout is a hue angle of the output image signal, Cin is a hue angle of the input image signal, Cdif is the maximum saturation-hue shift amount, Cdata is the saturation in the input image signal, and Cmax is the saturation in the maximum saturation point. Further, Cn12 is the compression coefficient for weighting and it is the non-linear coefficient for adjusting the non-linear property.

It is possible to change the hue shift amount by changing the compression coefficient Cn12.

Next, as the compression about the above-mentioned brightness shift amount, the method described in, for example, Japanese Patent Application Laid-Open No. 2005-184602 may be adapted. In this method, the brightness is converted by a predetermined brightness conversion function. In the brightness conversion function, the brightness is changed in a way of changing the degree of brightness conversion according to the saturation in the input image signal. The brightness varies widely in the high saturation region, while the brightness does not change much in the low saturation region. The brightness conversion function includes the compression coefficient as a parameter, which is set for attaching a weight to the brightness conversion degree in the saturation direction. Specifically, an index function like the following formula is used.

$$L\text{out} = L\text{in} - L\text{dif} \times (C\text{in}/C\text{max})^{Cn13} \quad (4)$$

In the formula (4), Lout is the brightness value after the conversion, Lin is the brightness value before the conversion, Ldif is the brightness adjustment value, Cin is the saturation in the input image signal, and Cmax is the saturation of the maximum saturation point in the input color gamut. Further, Cn13 is the compression coefficient for weighting and it is the non-linear coefficient for adjusting the non-linear property.

The brightness shift amount may be changed by changing the compression coefficient cn13.

In Step 108, the color conversion coefficient setting section 12 creates the color conversion LUT according to the color rendering intent and color converting object selected by a user, and stores it into the memory 13. It creates the color conversion LUT indicating the correspondence between each lattice point and each value of YMCK, by converting the values of L*, a*, and b* of a lattice point of each lattice obtained by dividing the three dimensional CIE-L*a*b* color space, by the respective compression functions using the compression coefficients Cn11 to 3 set in Step 106, hence to obtain the values of YMCK corresponding to the respective values. The created color conversion LUT is stored into the memory 13. Therefore, from the next time, when the same color rendering intent and color converting object is selected, it is possible to speed up the color conversion.

In creating the color conversion LUT, the color conversion LUT with plural kinds of black generation (K), for example, for graphics, for images, and the like set there may be created so that a user may select a desired black generation.

Not only the color conversion LUT of Lab-YMCK but also the color conversion LUT of RGB-YMCK may be created and stored into the memory 13.

In Step 110, the color conversion coefficient setting section 12 outputs the color conversion LUT created in Step 108 to the color converter 11.

In Step 112, the created color conversion LUT is stored into the memory 13 in association with the color rendering intent and color converting object. Therefore, from the next time, when the same color rendering intent and color converting object is set, it is not necessary to create the color conversion LUT but it is possible to speed up the color conversion by reading it from the memory 13.

The created color conversion LUT may be named by a user and stored into the memory 13, which enables a user to specify the name and to read the color conversion LUT corresponding to the name from the memory 13. Alternatively, not the color conversion LUT, but each of the color conversion functions set in step 106 may be named by a user and stored into the memory 13, which enables a user to specify the name and to read the color conversion function corresponding to the name from the memory 13. In this case, the color conversion LUT may be created with the read color conversion coefficient, as mentioned above.

In Step 116, the color converter 11 converts the input image signal inputted to the color converter 11 into the output image signal, with the color conversion LUT outputted from the color conversion coefficient setting section 12. After the input image signal of the RGB color space is converted into the signal of the CIE-L*a*b* color space, the values of L*, a*, b* are converted into the values for the color image signal of YMCK. When the color conversion LUT doesn't include the values of YMCK corresponding to the values of L*, a*, b* of the input image signal, the values of YMCK are obtained by interpolating the values around the color conversion LUT in the known interpolation method.

In the exemplary embodiment, intents are not the fixed ones but the ratio among the intents may be set by a user and the gamut compression/decompression function may be determined (the compression coefficient is determined) for every element of the gamut compression/decompression according to the ratio, to perform the gamut compression/decompression processing, which enables the color conversion according to the user's taste. Further, by setting the ratio among the intents, it is possible for a user to perform the color conversion easily according to his or her intention without any specific knowledge about the color conversion.

In the exemplary embodiment, although the case where the color conversion is performed by setting the color rendering intent and the color converting object in Step 102 and creating the color conversion LUT corresponding to this or reading out it from the memory 13 has been described, the gamut compression/decompression element may be set by a user. By enabling a user to define the gamut compression/decompression element, it is possible to do the fine setting and reproduce a color properly according to the user's intention.

A user may be enabled to do such a setting that a predetermined primary color of CMYK and the like is reproduced in pure color. In this case, the above-described color conversion is not performed on the predetermined primary color, but the other color conversion processing of always converting the pure color into pure color is performed there. This satisfies the user's request to reproduce a pure color always just in a pure color.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. A color converter comprising:
a setting section that sets a ratio between a plurality of color rendering intents;
a determining section that determines a color conversion function for converting a first image signal in a first color space into a second image signal in a second color space different from the first color space, based on the ratio between the color rendering intents; and
a converting section that converts the first image signal into the second image signal based on the color conversion function determined by the determining section, wherein
the determining section determines the color conversion function for a gamut compression/decompression element when the color conversion function based on the ratio between the color rendering intents is not stored,
the setting section can store the determined color conversion function with a name,
the gamut compression/decompression element comprises at least one of brightness and saturation compression ratio, hue shift amount, gradation number in a hue direction, brightness shift amount, or saturation gradation number, the brightness and saturation compression ratio and the saturation gradation number is based on $L'out = L'in \times (Lout1/Lin1)^{f(x)}$ and $f(x) = (L'in/Lin1)^{Cn11}$, where Cn11 is a first compression coefficient, L'out is a distance from an achromatic color point to the second image signal, L'in is a distance from the achromatic color point to the first image signal, Lout1 is a distance from the achromatic color point to an outer point of a color gamut of the second image signal, and Lin1 is a distance from the achromatic color point to an outer point of a color gamut of the first image signal,
the hue shift amount is based on $Cout = Cin1 - Cdif \times (Cdata/Cmax1)^{Cn12}$, where, Cout is a hue angle of the second image signal, Cin1 is a hue angle of the first image signal, Cdif is a maximum saturation-hue shift amount, Cdata is a saturation in the first image signal, Cmax1 is a saturation of a maximum saturation point, Cn12 is a second compression coefficient, and
the brightness shift amount is based on $Lout2 = Lin2 - Ldif \times (Cin2/Cmax2)^{Cn13}$, where Lout2 is a brightness value after conversion, Lin2 is a brightness value before conversion, Ldif is a brightness adjustment value, Cin2 is a saturation in the first image signal, Cmax2 is a saturation of the maximum saturation point, and Cn13 is a third compression coefficient.

2. The color converter of claim 1, wherein
the determining section determines the color conversion function based on a color converting object and the ratio between the color rendering intents.

3. The color converter of claim 2, wherein
the color converting object comprises at least one of a natural image, graphics, text, or gradation.

4. The color converter of claim 1, wherein
the plurality of the color rendering intents comprise at least two of Perceptual, Saturation, or Colorimetric, as defined in an ICC profile.

5. The color converter of claim 1, wherein
the plurality of the color rendering intents comprise at least two of monitor emphasizing, saturation emphasizing, gradation reproducibility, contrast, or colorimetric matching.

6. The color converter of claim 1, wherein
the setting section can set the gamut compression/decompression element for determining the color conversion function.

7. The color converter of claim 1, wherein
the setting section can set pure color reproduction for a predetermined primary color.

8. The color converter of claim 1, wherein
the converting section creates, based on the color conversion function determined by the determining section, a color conversion look-up table for converting the first image signal into the second image signal.

9. The color converter of claim 8, wherein
the color conversion look-up table comprises a plurality of kinds of black generation and the setting section can set the black generation.

10. The color converter of claim 8, wherein
the setting section can store the created color conversion look-up table with a name.

11. The color converter of claim 1, wherein
the first color space comprises at least one of a CIE-L*a*b* color space or an RGB color space.

12. The color converter of claim 1, wherein
the second color space comprises at least one of a YMCK color space or a YMC color space.

13. A color converting method comprising:
setting a ratio between a plurality of color rendering intents;
determining a color conversion function for converting a first image signal in a first color space into a second image signal in a second color space different from the first color space, based on the ratio between the color rendering intents;
determining the color conversion function for a gamut compression/decompression element when the color conversion function based on the ratio between the color rendering intents is not stored;
converting the first image signal into the second image signal based on the determined color conversion function; and
storing the determined color conversion function with a name, wherein
the gamut compression/decompression element comprises at least one of brightness and saturation compression ratio, hue shift amount, gradation number in a hue direction, brightness shift amount, or saturation gradation number, the brightness and saturation compression ratio and the saturation gradation number is based on $L'out=L'in \times (Lout1/Lin1)^{f(x)}$ and $f(x)=(L'in/Lin1)^{Cn11}$, where Cn11 is a first compression coefficient, L'out is a distance from an achromatic color point to the second image signal, L'in is a distance from the achromatic color point to the first image signal, Lout1 is a distance from the achromatic color point to an outer point of a color gamut of the second image signal, and Lin1 is a distance from the achromatic color point to an outer point of a color gamut of the first image signal, the hue shift amount is based on $Cout=Cin1-Cdif \times (Cdata/Cmax1)^{Cn12}$, where, Cout is a hue angle of the second image signal, Cin1 is a hue angle of the first image signal, Cdif is a maximum saturation-hue shift amount, Cdata is a saturation in the first image signal, Cmax1 is a saturation of a maximum saturation point, Cn12 is a second compression coefficient, and the brightness shift amount is based on $Lout2=Lin2-Ldif \times (Cin2/Cmax2)^{Cn13}$, where Lout2 is a brightness value after conversion, Lin2 is a brightness value before conversion, Ldif is a brightness adjustment value, Cin2 is a saturation in the first image signal, Cmax2 is a saturation of the maximum saturation point, and Cn13 is a third compression coefficient.

14. The color converting method of claim 13, wherein:

the determining further comprises determining whether or not a color conversion look-up table, for converting the first image signal into the second image signal based on the determined color conversion function, is stored, and when the color conversion look-up table is stored reading the stored table, and when the color conversion look-up table is not stored creating the color conversion look-up table for converting the first image signal into the second image signal based on the determined color conversion function; and the converting further comprises converting the first image signal into the second image signal based on the color conversion look-up table.

15. The color converting method of claim 14, wherein the determining further comprises storing the color conversion look-up table with a name in association with the color rendering intents, and the setting further comprises setting the ratio between the plurality of the color rendering intents by reading the color rendering intents stored in association with the name.

16. A non-transitory computer readable medium storing a program causing a computer to execute a process for color conversion, the process comprising:

setting a ratio between a plurality of color rendering intents;

determining a color conversion function for converting a first image signal in a first color space into a second image signal in a second color space different from the first color space, based on the ratio between the color rendering intents;

determining the color conversion function for a gamut compression/decompression element when the color conversion function based on the ratio between the color rendering intents is not stored;

converting the first image signal into the second image signal based on the determined color conversion function;

storing the determined color conversion function with a name, wherein the gamut compression/decompression element comprises at least one of brightness and saturation compression ratio, hue shift amount, gradation number in a hue direction, brightness shift amount, or saturation gradation number, the brightness and saturation compression ratio and the saturation gradation number is based on $Lout=L'in \times (Lout1/Lin1)^{f(x)}$ and $f(x)=(L'in/Lin1)^{Cn11}$, where Cn11 is a first compression coefficient, L'out is a distance from an achromatic color point to the second image signal, L'in is a distance from the achromatic color point to the first image signal, Lout1 is a distance from the achromatic color point to an outer point of a color gamut of the second image signal, and Lin1 is a distance from the achromatic color point to an outer point of a color gamut of the first image signal, the hue shift amount is based on $Cout=Cin1-Cdif \times (Cdata/Cmax1)^{Cn12}$, where, Cout is a hue angle of the second image signal, Cin1 is a hue angle of the first image signal, Cdif is a maximum saturation-hue shift amount, Cdata is a saturation in the first image signal, Cmax1 is a saturation of a maximum saturation point, Cn12 is a second compression coefficient, and the brightness shift amount is based on $Lout2=Lin2-Ldif \times (Cin2/Cmax2)^{Cn13}$, where Lout2 is a brightness value after conversion, Lin2 is a brightness value before conversion, Ldif is a brightness adjustment value, Cin2 is a saturation in the first image signal, Cmax2 is a saturation of the maximum saturation point, and Cn13 is a third compression coefficient.

* * * * *